US011908377B2

(12) United States Patent
In et al.

(10) Patent No.: US 11,908,377 B2
(45) Date of Patent: Feb. 20, 2024

(54) REPAIR PIXEL AND DISPLAY APPARATUS HAVING THE SAME

(71) Applicant: Samsung Display Co., LTD., Yongin-si (KR)

(72) Inventors: Hai-Jung In, Seoul (KR); Sungmin Son, Cheonan-si (KR); Jae-Jin Song, Hwaseong-si (KR)

(73) Assignee: Samsung Display Co., LTD., Yongin-si (KR)

( * ) Notice: Subject to any disclaimer, the term of this patent is extended or adjusted under 35 U.S.C. 154(b) by 0 days.

(21) Appl. No.: 17/831,442

(22) Filed: Jun. 3, 2022

(65) Prior Publication Data

US 2023/0061839 A1 Mar. 2, 2023

(30) Foreign Application Priority Data

Aug. 24, 2021 (KR) ........................ 10-2021-0111566

(51) Int. Cl.
*G09G 3/20* (2006.01)
*G09G 3/32* (2016.01)
*G09G 3/3208* (2016.01)
*G09G 3/3233* (2016.01)

(52) U.S. Cl.
CPC ......... *G09G 3/2092* (2013.01); *G09G 3/3208* (2013.01); *G09G 3/3233* (2013.01); *G09G 3/32* (2013.01); *G09G 2310/0275* (2013.01); *G09G 2330/08* (2013.01); *G09G 2330/10* (2013.01)

(58) Field of Classification Search
CPC ...... G09G 3/2092; G09G 3/32; G09G 3/3208; G09G 2310/0275; G09G 2330/08; G09G 2330/10; G09G 3/3233
See application file for complete search history.

(56) References Cited

U.S. PATENT DOCUMENTS

| | | | | |
|---|---|---|---|---|
| 8,258,692 B2 | 9/2012 | Hong et al. | | |
| 9,256,109 B2 | 2/2016 | Kang et al. | | |
| 2014/0198085 A1* | 7/2014 | Park | G09G 3/3241 | 345/212 |
| 2016/0140897 A1* | 5/2016 | Park | G09G 3/3233 | 345/77 |
| 2016/0189585 A1* | 6/2016 | Na | G09G 3/3233 | 345/55 |
| 2016/0218155 A1* | 7/2016 | Park | H10K 59/131 | |
| 2016/0335950 A1* | 11/2016 | Kang | G09G 3/2085 | |
| 2020/0043411 A1* | 2/2020 | Tsuge | G09G 3/3266 | |
| 2020/0184886 A1* | 6/2020 | Chun | G09G 3/3291 | |

FOREIGN PATENT DOCUMENTS

| | | |
|---|---|---|
| JP | 2009-026586 | 2/2009 |
| KR | 10-2008-0081235 | 9/2008 |
| KR | 10-0932989 | 12/2009 |
| KR | 10-2017-0135650 | 12/2017 |
| KR | 10-1993334 | 6/2019 |
| KR | 10-2145850 | 8/2020 |

* cited by examiner

*Primary Examiner* — Nitin Patel
*Assistant Examiner* — Saifeldin E Elnafia
(74) *Attorney, Agent, or Firm* — H.C. Park & Associates, PLC

(57) ABSTRACT

A repair pixel and a display apparatus including the repair pixel, the display panel including a repair pixel for a pixel row or a plurality of repair pixels for a pixel row so that repair may be performed using the repair pixel when a bad pixel occurs in the corresponding pixel row. The bad pixel is repaired using the repair pixel so that the yield of the display panel may be enhanced.

19 Claims, 9 Drawing Sheets

REPAIR PIXEL AND DISPLAY APPARATUS HAVING THE SAME

CROSS-REFERENCE TO RELATED APPLICATION

This application claims priority from and the benefit of Korean Patent Application No. 10-2021-0111566, filed on Aug. 24, 2021, which is hereby incorporated by reference for all purposes as if fully set forth herein.

BACKGROUND

Field

Embodiments of the invention relate generally to a repair pixel and a display apparatus including the repair pixel. More particularly, embodiments of the present inventive concept relate to a repair pixel for enhancing a yield of a display panel and a display apparatus including the repair pixel.

Discussion of the Background

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

If the entire display panel is discarded when a defect occurs in a part of a circuit of the pixels, a yield of the display panel may decrease.

The above information disclosed in this Background section is only for understanding of the background of the inventive concept, and, therefore, it may contain information that does not constitute prior art.

SUMMARY

Embodiments of the present inventive concept provide a repair pixel for enhancing a yield of a display panel.

Embodiments of the present inventive concept also provide a display apparatus including the repair pixel.

Additional features of the inventive concept will be set forth in the description which follows, and in part will be apparent from the description, or may be learned by practice of the inventive concept.

An embodiment of the invention provides a repair pixel including a first transistor, a second transistor, a third transistor, a fourth transistor, a fifth transistor, and a sixth transistor. The first transistor includes a control electrode connected to a first node, an input electrode connected to a second node, and an output electrode connected to a third node. The second transistor includes a control electrode configured to receive a write gate signal, an input electrode configured to receive a data voltage, and an output electrode connected to the first node. The third transistor includes a control electrode configured to receive a reference gate signal, an input electrode configured to receive a reference voltage, and an output electrode connected to the first node. The fourth transistor includes a control electrode configured to receive an initialization gate signal, an input electrode configured to receive an initialization voltage, and an output electrode connected to the third node. The fifth transistor includes a control electrode configured to receive an emission signal, an input electrode configured to receive a first power voltage, and an output electrode connected to the second node. The sixth transistor includes a control electrode configured to receive the emission signal, an input electrode connected to the third node, and an output electrode connected to a repair line.

The repair pixel may further include a storage capacitor including a first electrode connected to the first node and a second electrode connected to the third node.

The repair pixel may further include a hold capacitor including a first electrode configured to receive the first power voltage and a second electrode connected to the third node.

In a first duration, the emission signal may have an inactive level, the reference gate signal may have an active level, the initialization gate signal may have an active level and the write gate signal may have an inactive level.

In a second duration subsequent to the first duration, the emission signal may have an active level, the reference gate signal may have the active level, the initialization gate signal may have an inactive level, and the write gate signal may have the inactive level.

In a third duration subsequent to the second duration, the emission signal may have the inactive level, the reference gate signal may have an inactive level, the initialization gate signal may have the inactive level, and the write gate signal may have an active level.

The repair pixel may further include an initialization capacitor including a first electrode connected to the third node and a second electrode configured to receive the initialization voltage. When the reference voltage is VREF, a threshold voltage of the first transistor is VTH, the data voltage is VDATA, a capacitance of the storage capacitor is CST, a capacitance of the hold capacitor is CHOLD, a capacitance of the initialization capacitor is CINT, and a voltage of the third node in the third duration is VS, $$VS = (VREF - VTH) + \frac{CST}{CST + CHOLD + CINT}(VDATA - VREF)$$

may be satisfied.

When the reference voltage is VREF, a threshold voltage of the first transistor is VTH, the data voltage is VDATA, a capacitance of the storage capacitor is CST, a capacitance of the hold capacitor is CHOLD, and a voltage of the third node in the third duration is VS, $$VS = (VREF - VTH) + \frac{CST}{CST + CHOLD}(VDATA - VREF)$$

may be satisfied.

In a fourth duration subsequent to the third duration, the emission signal may have the inactive level, the reference gate signal may have the inactive level, the initialization gate signal may have the active level, and the write gate signal may have the inactive level.

In a fifth duration subsequent to the third duration, the emission signal may have the active level, the reference gate signal may have the inactive level, the initialization gate signal may have the inactive level, and the write gate signal may have the inactive level.

The repair pixel may further include an initialization capacitor including a first electrode connected to the third node and a second electrode configured to receive the initialization voltage. When the reference voltage is VREF, the data voltage is VDATA, a capacitance of the storage capacitor is CST, a capacitance of the hold capacitor is CHOLD, a capacitance of the initialization capacitor is CINT, a mobility of the first transistor is a capacitance per a unit area of the first transistor is $C_{ox}$, a width to length ratio of the first transistor is W/L, and a source-drain current of the first transistor in the fifth duration is IDS, $$IDS = \frac{1}{2}uCox\frac{W}{L}\left(\frac{CHOLD + CINT}{CST + CHOLD + CINT}(VDATA - VREF)\right)^2$$

may be satisfied.

When the reference voltage is VREF, the data voltage is VDATA, a capacitance of the storage capacitor is CST, a capacitance of the hold capacitor is CHOLD, a mobility of the first transistor is a capacitance per a unit area of the first transistor is $C_{ox}$, a width to length ratio of the first transistor is W/L, and a source-drain current of the first transistor in the fifth duration is IDS, $$IDS = \frac{1}{2}uCox\frac{W}{L}\left(\frac{CHOLD}{CST + CHOLD}(VDATA - VREF)\right)^2$$

may be satisfied.

Another embodiment of the invention provides a display apparatus including a display panel, a gate driver, a data driver, and an emission driver. The display panel includes a normal pixel and a repair pixel. The gate driver is configured to apply a gate signal to the normal pixel and the repair pixel. The data driver is configured to apply a data voltage to the normal pixel and the repair pixel. The emission driver is configured to apply an emission signal to the normal pixel and the repair pixel. The repair pixel includes a first transistor including a control electrode connected to a first node, an input electrode connected to a second node, and an output electrode connected to a third node; a second transistor including a control electrode configured to receive a write gate signal, an input electrode configured to receive the data voltage, and an output electrode connected to the first node; a third transistor including a control electrode configured to receive a reference gate signal, an input electrode configured to receive a reference voltage, and an output electrode connected to the first node; a fourth transistor including a control electrode configured to receive an initialization gate signal, an input electrode configured to receive an initialization voltage, and an output electrode connected to the third node; a fifth transistor including a control electrode configured to receive the emission signal, an input electrode configured to receive a first power voltage, and an output electrode connected to the second node; and a sixth transistor including a control electrode configured to receive the emission signal, an input electrode connected to the third node, and an output electrode connected to a repair line.

The repair pixel may further include a storage capacitor including a first electrode connected to the first node and a second electrode connected to the third node.

The repair pixel may further include a hold capacitor including a first electrode configured to receive the first power voltage and a second electrode connected to the third node.

The repair pixel may further include an initialization capacitor including a first electrode connected to the third node and a second electrode configured to receive the initialization voltage.

The normal pixel may include a first normal transistor including a control electrode connected to a first normal node, an input electrode connected to a second normal node, and an output electrode connected to a third normal node; a second normal transistor including a control electrode configured to receive the write gate signal, an input electrode configured to receive the data voltage, and an output electrode connected to the first normal node; a third normal transistor including a control electrode configured to receive the reference gate signal, an input electrode configured to receive the reference voltage, and an output electrode connected to the first normal node; a fourth normal transistor including a control electrode configured to receive the initialization gate signal, an input electrode configured to receive the initialization voltage, and an output electrode connected to the third normal node; a fifth normal transistor including a control electrode configured to receive the emission signal, an input electrode configured to receive the first power voltage, and an output electrode connected to the second normal node; and a light emitting element including a first electrode connected to the third normal node and a second electrode configured to receive a second power voltage.

The normal pixel may further include a normal storage capacitor including a first electrode connected to the first normal node and a second electrode connected to the third normal node, and a normal hold capacitor including a first electrode configured to receive the first power voltage and a second electrode connected to the third normal node.

The display panel may include first normal pixels disposed in a first pixel row and a first repair pixel disposed in the first pixel row and connected to the first normal pixels to repair a defect of the first normal pixels.

The display panel may include first left normal pixels disposed in a left portion of a first pixel row, a first repair pixel disposed in the first pixel row and connected to the first left normal pixels to repair a defect of the first left normal pixels, first right normal pixels disposed in a right portion of the first pixel row, and a second repair pixel disposed in the first pixel row and connected to the first right normal pixels to repair a defect of the first right normal pixels.

According to the repair pixel and the display apparatus including the repair pixel, the display panel includes a repair pixel for a pixel row or a plurality of repair pixels for a pixel row so that repair may be performed using the repair pixel when a bad pixel occurs in the corresponding pixel row. The bad pixel is repaired using the repair pixel so that the yield of the display panel may be enhanced.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concept.

DETAILED DESCRIPTION OF THE INVENTIVE CONCEPT

Figure 1:
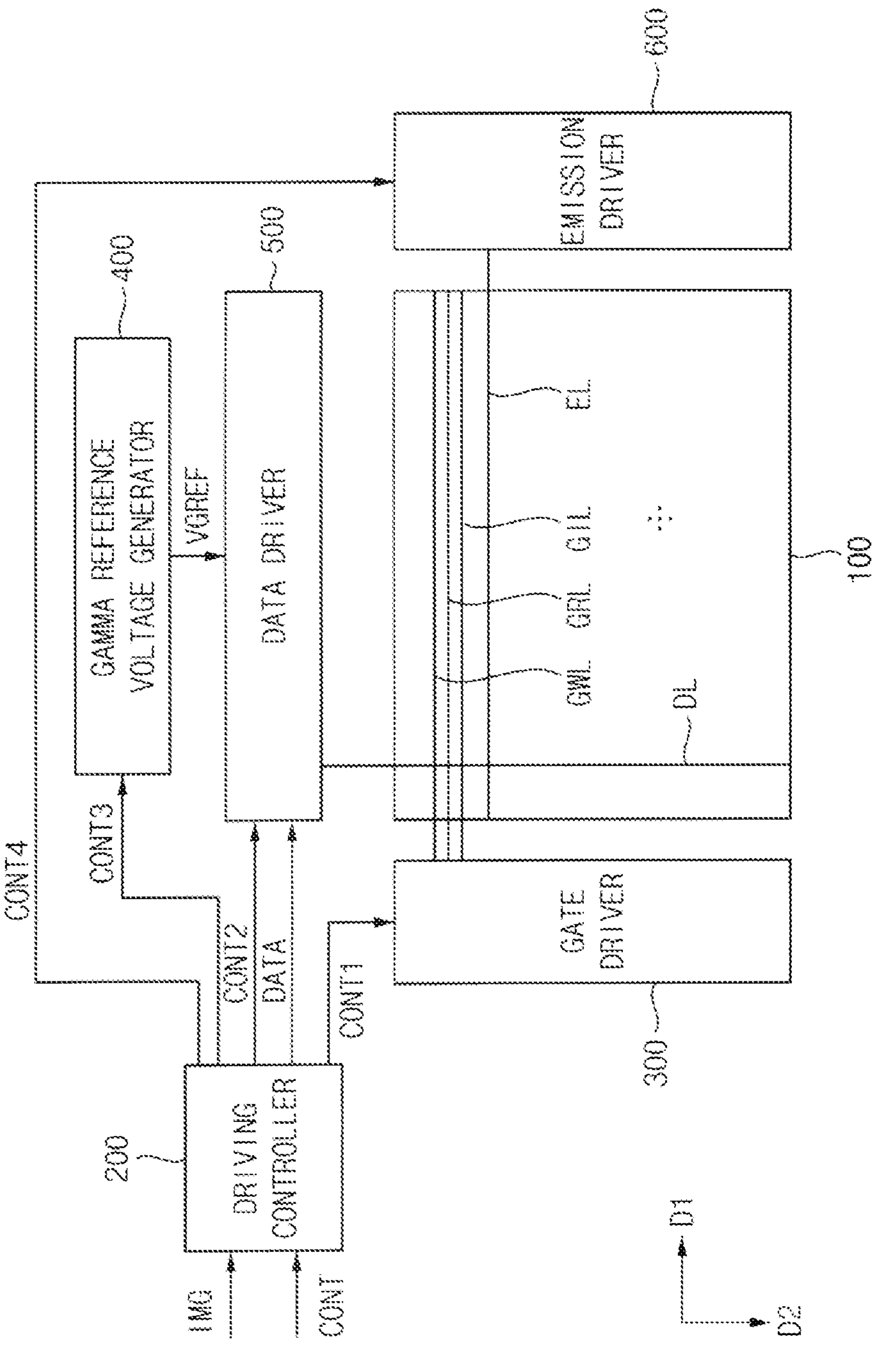
FIG. 1 is a block diagram illustrating a display apparatus according to an embodiment of the present inventive concept.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing the inventive concept disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concept.

Unless otherwise specified, the illustrated embodiments are to be understood as providing illustrative features of varying detail of some ways in which the inventive concept may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concept.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concept. Further, the blocks, units, and/or modules of some embodiments may be physically combined into more complex blocks, units, and/or modules without departing from the scope of the inventive concept.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the present inventive concept will be explained in detail with reference to the accompanying drawings.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500, and an emission driver 600.

The display panel 100 has a display region on which an image is displayed and a peripheral region adjacent to the display region.

The display panel 100 includes a plurality of gate lines GWL, GRL, and GIL, a plurality of data lines DL, a plurality of emission lines EL, and a plurality of pixels electrically connected to the gate lines GWL, GRL and GIL, the data lines DL, and the emission lines EL. The gate lines GWL, GRL, and GIL may extend in a first direction D1, the data lines DL may extend in a second direction D2 crossing the first direction D1, and the emission lines EL may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GRL, and GIL in response to the first control signal CONT1 received from the driving controller 200. The gate driver 300 may sequentially output the gate signals to the gate lines GWL, GRL, and GIL. For example, the gate driver 300 may be mounted on the peripheral region of the display panel 100. For example, the gate driver 300 may be integrated on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200 or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. For example, the emission driver 600 may be mounted on the peripheral region of the display panel 100. For example, the emission driver 600 may be integrated on the peripheral region of the display panel 100.

Although the gate driver 300 is disposed at a first side of the display panel 100 and the emission driver 600 is disposed at a second side of the display panel 100 opposite to the first side in FIG. 1 for convenience of explanation, the present inventive concept may not be limited thereto. For example, both the gate driver 300 and the emission driver 600 may be disposed at the first side of the display panel 100. For example, the gate driver 300 and the emission driver 600 may be integrally formed.

Figure 2:
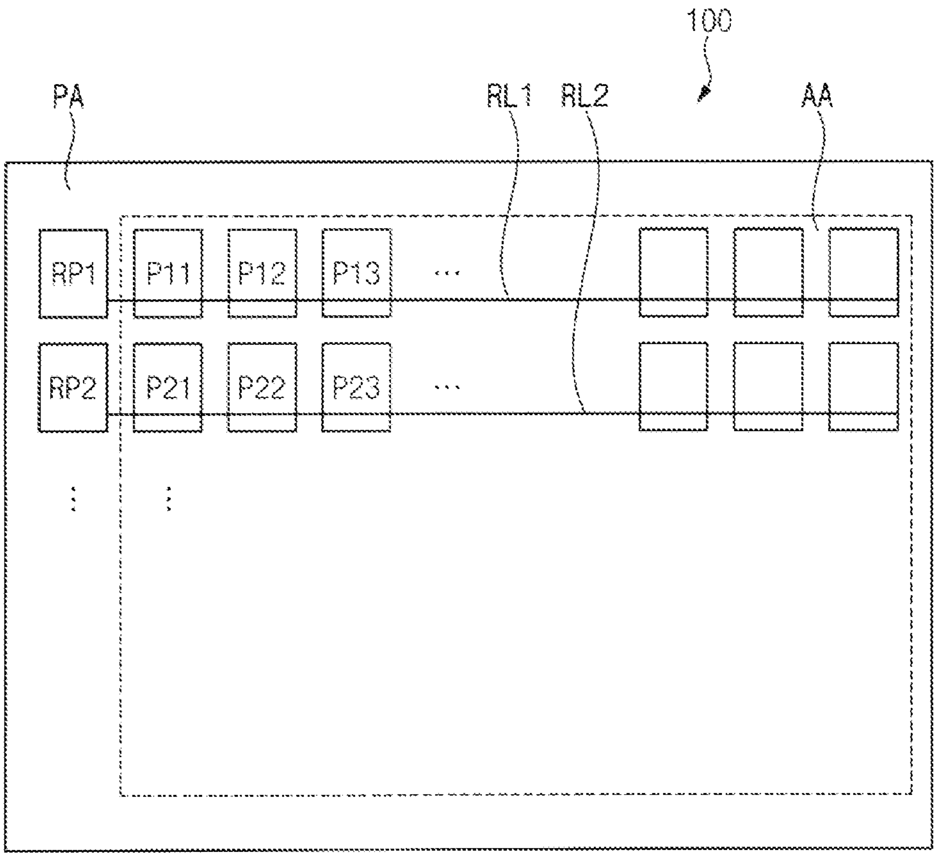
FIG. 2 is a plan view illustrating an example of a repair pixel and a normal pixel of a display panel of FIG. 1.

FIG. 2 is a plan view illustrating an example of a repair pixel and a normal pixel of the display panel 100 of FIG. 1.

Referring to FIGS. 1 and 2, one repair pixel may be disposed for one pixel row in the present embodiment.

For example, the display panel 100 may include first normal pixels P11, P12, P13, . . . disposed in a first pixel row and a first repair pixel RP1 disposed in the first pixel row and connected to the first normal pixels P11, P12, P13, . . . to repair a defect of the first normal pixels P11, P12, P13, . . . .

The first normal pixels P11, P12, P13, . . . and the first repair pixel RP1 may be connected through a first repair line RL1. The first repair line RL1 may extend in the first direction D1.

For example, the display panel 100 may include second normal pixels P21, P22, P23, . . . disposed in a second pixel row and a second repair pixel RP2 disposed in the second pixel row and connected to the second normal pixels P21, P22, P23, . . . to repair a defect of the second normal pixels P21, P22, P23, . . . .

The second normal pixels P21, P22, P23, . . . and the second repair pixel RP2 may be connected through a second repair line RL2. The second repair line RL2 may extend in the first direction D1.

The normal pixels P11, P12, P13, P21, P22, P23, . . . may be disposed in the display region AA of the display panel 100. The first repair pixel RP1 and the second repair pixel RP2 may be disposed in the peripheral region PA of the display panel 100.

Figure 3:
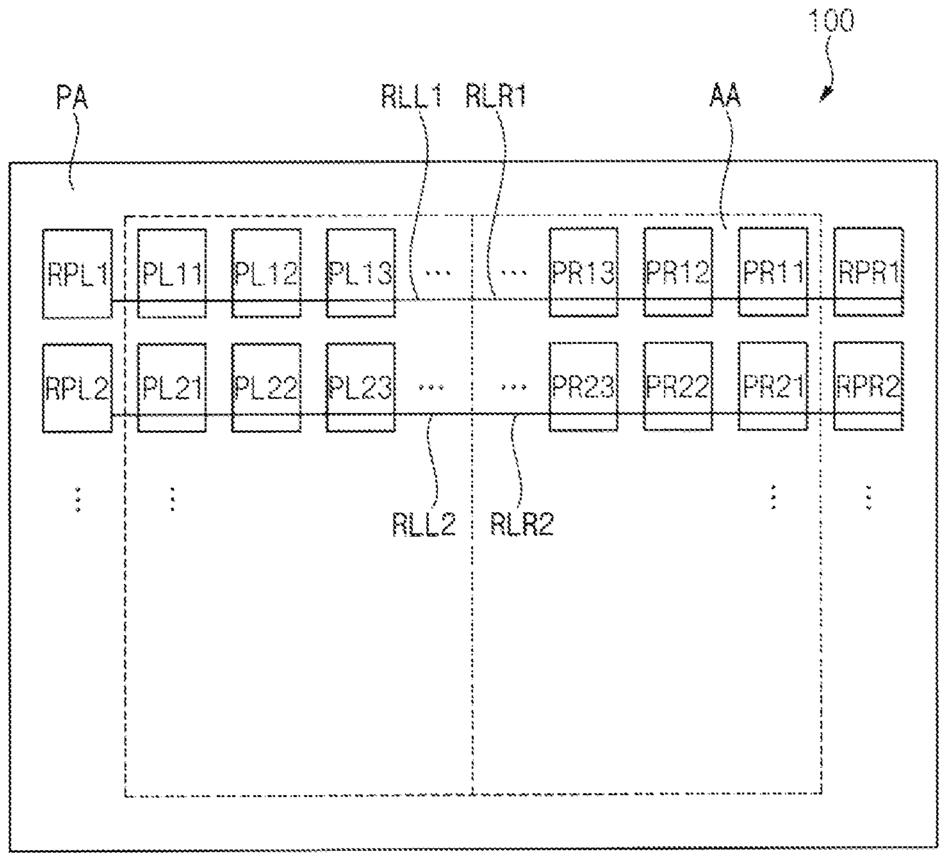
FIG. 3 is a plan view illustrating an example of the repair pixel and the normal pixel of the display panel of FIG. 1.

FIG. 3 is a plan view illustrating an example of the repair pixel and the normal pixel of the display panel 100 of FIG. 1.

Referring to FIGS. 1 and 3, a plurality of repair pixels may be disposed for one pixel row in the present embodiment. For example, two repair pixels may be disposed for one pixel row.

For example, the display panel 100 may include first left normal pixels PL11, PL12, PL13, . . . disposed in a left portion of a first pixel row, a first repair pixel RPL1 disposed in the first pixel row and connected to the first left normal pixels PL11, PL12, PL13, . . . to repair a defect of the first left normal pixels PL11, PL12, PL13, . . . , first right normal pixels PR11, PR12, PR13, . . . disposed in a right portion of the first pixel row, a second repair pixel RPR1 disposed in the first pixel row and connected to the first right normal pixels PR11, PR12, PR13, . . . to repair a defect of the first right normal pixels PR11, PR12, PR13, . . . .

The first left normal pixels PL11, PL12, PL13, . . . and the first repair pixel RPL1 may be connected through a first repair line RLL1. The first repair line RLL1 may extend in the first direction D1. The first right normal pixels PR11, PR12, PR13, . . . and the second repair pixel RPR1 may be connected through a second repair line RLR1. The second repair line RLR1 may extend in the first direction D1.

For example, the display panel 100 may include second left normal pixels PL21, PL22, PL23, . . . disposed in a left portion of a second pixel row, a third repair pixel RPL2 disposed in the second pixel row and connected to the second left normal pixels PL21, PL22, PL23, . . . to repair a defect of the second left normal pixels PL21, PL22, PL23, . . . , second right normal pixels PR21, PR22, PR23, . . . disposed in a right portion of the second pixel row, a fourth repair pixel RPR2 disposed in the second pixel row and connected to the second right normal pixels PR21, PR22, PR23, . . . to repair a defect of the second right normal pixels PR21, PR22, PR23, . . . .

The second left normal pixels PL21, PL22, PL23, . . . and the third repair pixel RPL2 may be connected through a third repair line RLL2. The third repair line RLL2 may extend in the first direction D1. The second right normal pixels PR21, PR22, PR23, . . . and the fourth repair pixel RPR2 may be connected through a fourth repair line RLR2. The fourth repair line RLR2 may extend in the first direction D1.

Figure 4:
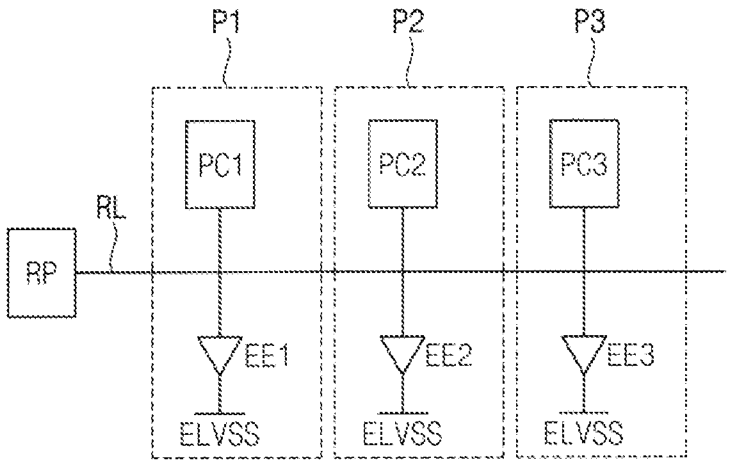
FIG. 4 is a conceptual diagram illustrating the repair pixel and the normal pixel of the display panel of FIG. 1 when a bad pixel (a pixel defect) has not occurred.
Figure 5:
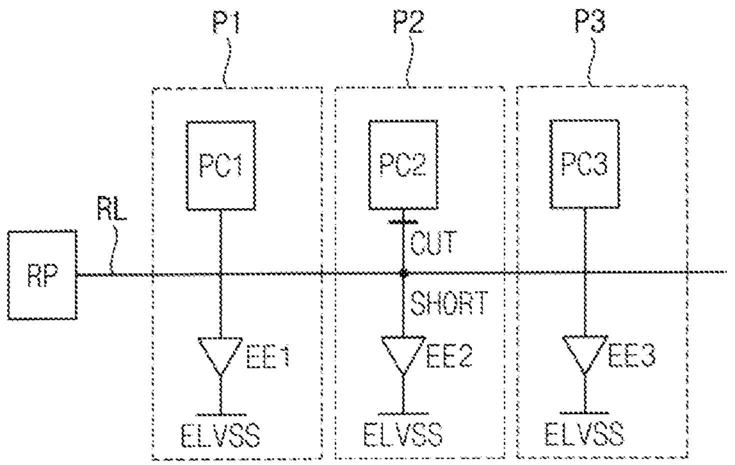
FIG. 5 is a conceptual diagram illustrating the repair pixel and the normal pixel of the display panel of FIG. 1 when a bad pixel (a pixel defect) has occurred.

FIG. 4 is a conceptual diagram illustrating the repair pixel and the normal pixel of the display panel 100 of FIG. 1 when a bad pixel (a pixel defect) is not occurred. FIG. 5 is a conceptual diagram illustrating the repair pixel and the normal pixel of the display panel 100 of FIG. 1 when a bad pixel (a pixel defect) is occurred.

As shown in FIG. 4, a repair line RL may extend from a repair pixel RP in the first direction D1, and the repair line RL may pass between pixel circuits PC1, PC2, and PC3 of the normal pixels P1, P2, and P3 and light emitting elements EE1, EE2, and EE3 of the normal pixels P1, P2, and P3. First electrodes of the light emitting elements EE1, EE2, and EE3 may be connected to the pixel circuits PC1, PC2, and PC3 and second electrodes of the light emitting elements EE1, EE2 and EE3 may be connected to a terminal of a second power voltage ELVSS.

FIG. 5 represents a case in which a defect occurs in the pixel circuit PC2 of the second normal pixel P2. When the defect occurs in the pixel circuit PC2 of the second normal pixel P2, a connection portion where the pixel circuit PC2 is connected to a second light emitting element EE2 of the second normal pixel P2 may be cut by a laser, and the repair line RL passing between the pixel circuit PC2 and the second light emitting element EE2 of the second normal pixel P2 may be shorted by the laser. Thus, the repair circuit RP may operate the second light emitting element EE2 so that the display panel 100 may operate normally even if a defect occurs in the pixel circuit PC2 of the second normal pixel P2.

Figure 6:
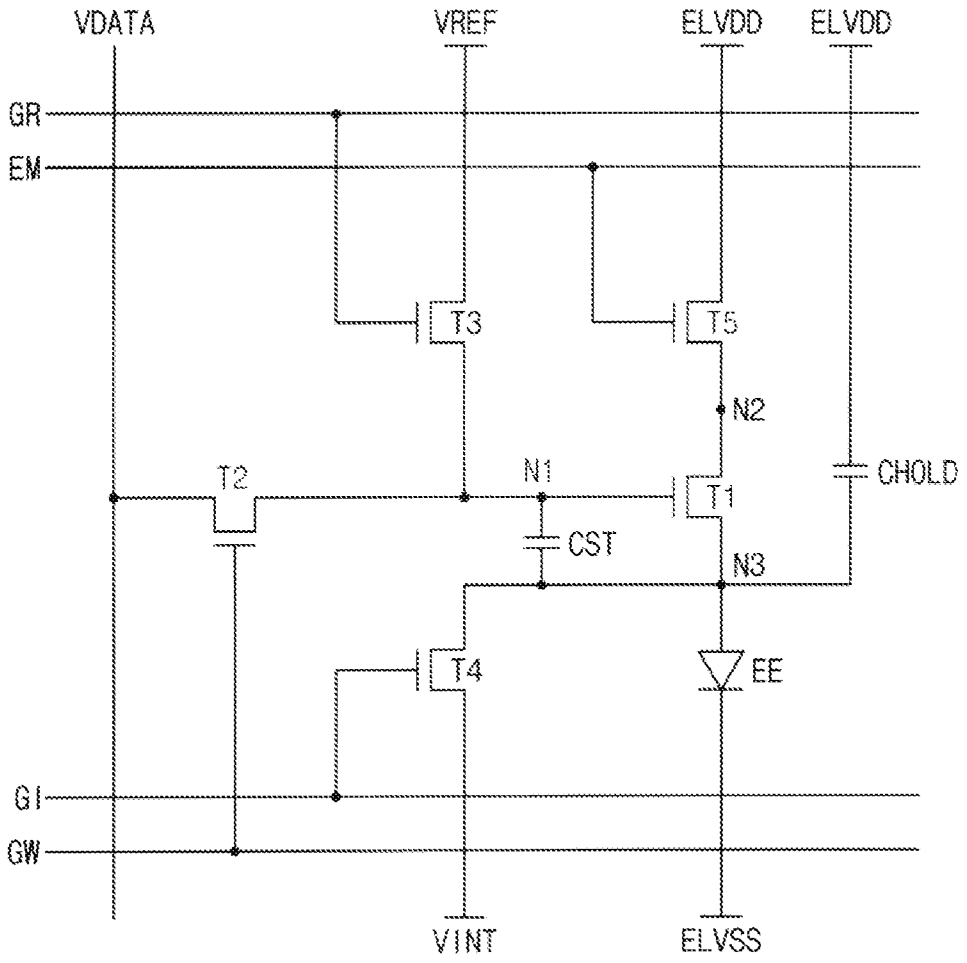
FIG. 6 is an equivalent circuit diagram illustrating the normal pixel of the display panel of FIG. 1.

FIG. 6 is an equivalent circuit diagram illustrating the normal pixel of the display panel 100 of FIG. 1.

Referring to FIGS. 1 to 6, the normal pixel may include a first normal transistor T1 including a control electrode connected to a first normal node N1, an input electrode connected to a second normal node N2, and an output electrode connected to a third node N3; a second normal transistor T2 including a control electrode receiving a write gate signal GW, an input electrode receiving the data voltage VDATA, and an output electrode connected to the first normal node N1; a third normal transistor T3 including a control electrode receiving a reference gate signal GR, an input electrode receiving a reference voltage VREF, and an output electrode connected to the first normal node N1; a fourth normal transistor T4 including a control electrode receiving an initialization gate signal GI, an input electrode receiving an initialization voltage VINT, and an output electrode connected to the third node N3; a fifth normal transistor T5 including a control electrode receiving the emission signal EM, an input electrode receiving a first power voltage ELVDD and an output electrode connected to the second normal node N2; and a light emitting element EE including a first electrode connected to the third normal node N3 and a second electrode receiving the second power voltage ELVSS.

Herein, the first transistor T1 to the fifth transistor T5 may be N-type transistors. Herein, the first transistor T1 to the fifth transistor T5 may be oxide transistors.

The normal pixel may further include a normal storage capacitor CST including a first electrode connected to the first normal node N1 and a second electrode connected to the third normal node N3, and a normal hold capacitor CHOLD including a first electrode receiving the first power voltage ELVDD and a second electrode connected to the third normal node N3.

Figure 7:
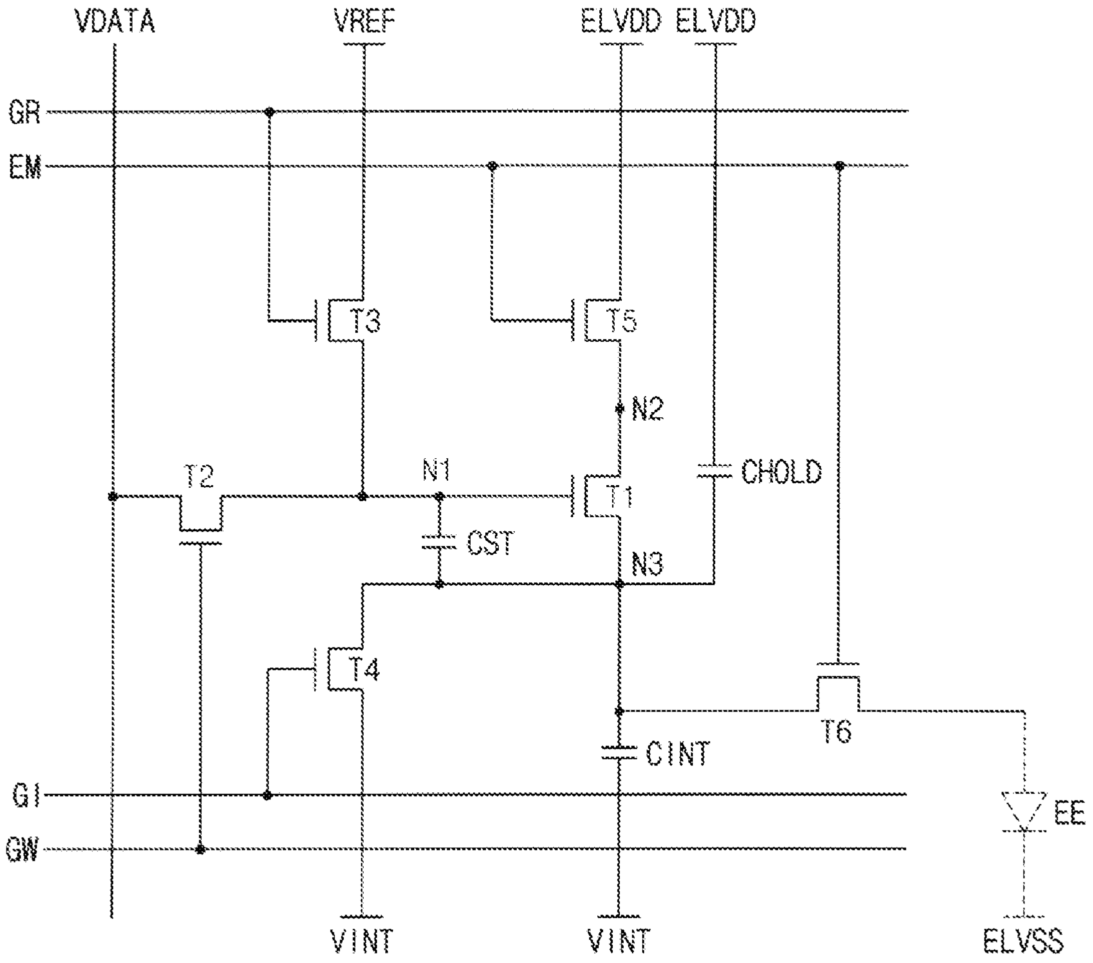
FIG. 7 is an equivalent circuit diagram illustrating the repair pixel of the display panel of FIG. 1.

FIG. 7 is an equivalent circuit diagram illustrating the repair pixel of the display panel 100 of FIG. 1.

Referring to FIGS. 1 to 7, the repair pixel may have a structure similar to a structure of the normal pixel. The repair pixel may not include the light emitting element. In contrast, the repair pixel may further include a sixth transistor T6 connected to the light emitting element EE of the normal pixel. The sixth transistor T6 may be connected to the light emitting element EE of the normal pixel through the repair line RL.

The repair pixel includes a first transistor T1 including a control electrode connected to a first node N1, an input electrode connected to a second node N2, and an output electrode connected to a third node N3; a second transistor T2 including a control electrode receiving a write gate signal GW, an input electrode receiving the data voltage VDATA, and an output electrode connected to the first node N1; a third transistor T3 including a control electrode receiving the reference gate signal GR, an input electrode receiving the reference voltage VREF, and an output electrode connected to the first node N1; a fourth transistor T4 including a control electrode receiving the initialization gate signal GI, an input electrode receiving the initialization voltage VINT, and an output electrode connected to the third node N3; a fifth transistor T5 including a control electrode receiving the emission signal EM, an input electrode receiving the first power voltage ELVDD, and an output electrode connected to the second node N2; and a sixth transistor T6 including a control electrode receiving the emission signal EM, an input electrode connected to the third node N3, and an output electrode connected to the repair line.

The repair pixel may further include a storage capacitor CST including a first electrode connected to the first node N1 and a second electrode connected to the third node N3.

The repair pixel may further include a hold capacitor CHOLD including a first electrode receiving the first power voltage ELVDD and a second electrode connected to the third node N3.

Herein, the first transistor T1 to the sixth transistor T6 may be N-type transistors. Herein, the first transistor T1 to the sixth transistor T6 may be oxide transistors.

In the present embodiment, the repair pixel may further include an initialization capacitor CINT including a first electrode connected to the third node N3 and a second electrode receiving the initialization voltage VINT.

Figure 8:
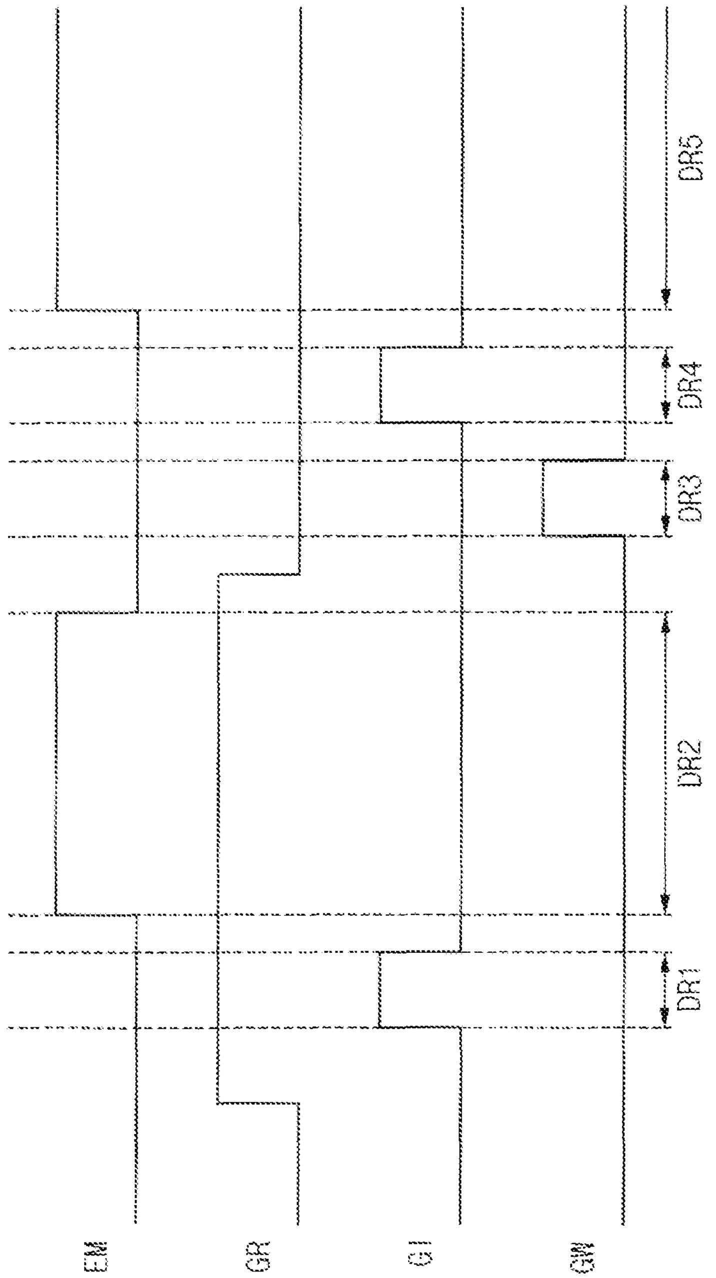
FIG. 8 is a timing diagram illustrating a gate signal and an emission signal applied to the normal pixel of FIG. 6 and the repair pixel of FIG. 7.

FIG. 8 is a timing diagram illustrating the gate signal GR, GI, and GW and the emission signal EM applied to the normal pixel of FIG. 6 and the repair pixel of FIG. 7.

Referring to FIGS. 1 to 8, in a first duration DR1, the emission signal EM may have an inactive level, the reference gate signal GR may have an active level, the initialization gate signal GI may have an active level, and the write gate signal GW may have an inactive level.

The first duration DR1 may be referred to as an initialization duration. In the first duration DR1, the transistors T2, T5 and T6 may be turned off, the transistors T3 and T4 may be turned on, the reference voltage VREF may be applied to the control electrode N1 of the transistor T1, and the initialization voltage VINT may be applied to a source electrode N3 of the transistor T1.

In a second duration DR2 subsequent to the first duration DR1, the emission signal EM may have an active level, the reference gate signal GR may have the active level, the initialization gate signal GI may have an inactive level, and the write gate signal GW may have the inactive level.

The second duration DR2 may be referred to as a threshold voltage compensation duration. In the second duration DR2, the transistors T3, T5 and T6 may be turned on, the transistor T4 may be turned on, the reference voltage VREF may be applied to the control electrode N1 of the transistor T1, and a voltage VREF-VTH may be applied to the source electrode N3 of the transistor T1. Herein, the threshold voltage VTH of the transistor T1 may be stored at both ends of the storage capacitor CST according to a source follower operation of the transistor T1.

In a third duration DR3 subsequent to the second duration DR2, the emission signal EM may have the inactive level, the reference gate signal GR may have an inactive level, the initialization gate signal GI may have the inactive level, and the write gate signal GW may have an active level.

The third duration DR3 may be referred to as a data writing duration. In the third duration DR3, the transistors T3, T4, T5, and T6 may be turned off, the transistor T2 may be turned on, the data voltage VDATA may be applied to the control electrode N1 of the transistor T1. Herein, the voltage of the source electrode N3 of the transistor T1 may be coupled with the voltage of the control electrode N1 of the transistor T1. When the reference voltage is VREF, the threshold voltage of the first transistor T1 is VTH, the data voltage is VDATA, a capacitance of the storage capacitor is CST, a capacitance of the hold capacitor is CHOLD, a capacitance of the initialization capacitor is CINT, and the voltage of the third node N3 in the third duration DR3 is VS, $$VS = (VREF - VTH) + \frac{CST}{CST + CHOLD + CINT}(VDATA - VREF)$$

may be satisfied.

In a fourth duration DR4 subsequent to the third duration DR3, the emission signal EM may have the inactive level, the reference gate signal GR may have the inactive level, the initialization gate signal GI may have the active level and the write gate signal GW may have the inactive level.

The fourth duration DR4 may be referred to as a post-initialization duration. In the fourth duration DR4, the transistors T2, T3, T5 and T6 may be turned off, the transistor T4 may be turned on, the source electrode N3 of the transistor T1 may be initialized to the initialization voltage VINT.

In a fifth duration DR5 subsequent to the fourth duration DR4, the emission signal EM may have the active level, the reference gate signal GR may have the inactive level, the initialization gate signal GI may have the inactive level, and the write gate signal GW may have the inactive level.

The fifth duration DR5 may be referred to as a light emission duration. In the fifth duration DR5, the transistors T2, T3, and T4 may be turned off, the transistors T5 and T6 may be turned on. When the reference voltage is VREF, the data voltage is VDATA, the capacitance of the storage capacitor is CST, the capacitance of the hold capacitor is CHOLD, the capacitance of the initialization capacitor is CINT, a mobility of the first transistor T1 is μ, a capacitance per a unit area of the first transistor T1 is $C_{ox}$, a width to length ratio of the first transistor T1 is W/L, and a source-drain current of the first transistor T1 in the fifth duration DR5 is IDS, $$IDS = \frac{1}{2}uCox\frac{W}{L}\left(\frac{CHOLD + CINT}{CST + CHOLD + CINT}(VDATA - VREF)\right)^2$$

may be satisfied.

In the above equation, the source-drain current IDS does not include a factor of the threshold voltage VTH so that the current for which the threshold voltage VTH is compensated may flow through the light emitting element EE in the light emission duration.

The normal pixel and the repair pixel may commonly operate in the first to fifth durations DR1 to DR5.

According to the present embodiment, the display panel 100 includes the repair pixel for one pixel row or the plurality of repair pixels for one pixel row so that repair may be performed using the repair pixel when a bad pixel occurs in the corresponding pixel row. The bad pixel is repaired using the repair pixel so that the yield of the display panel 100 may be enhanced.

Figure 9:
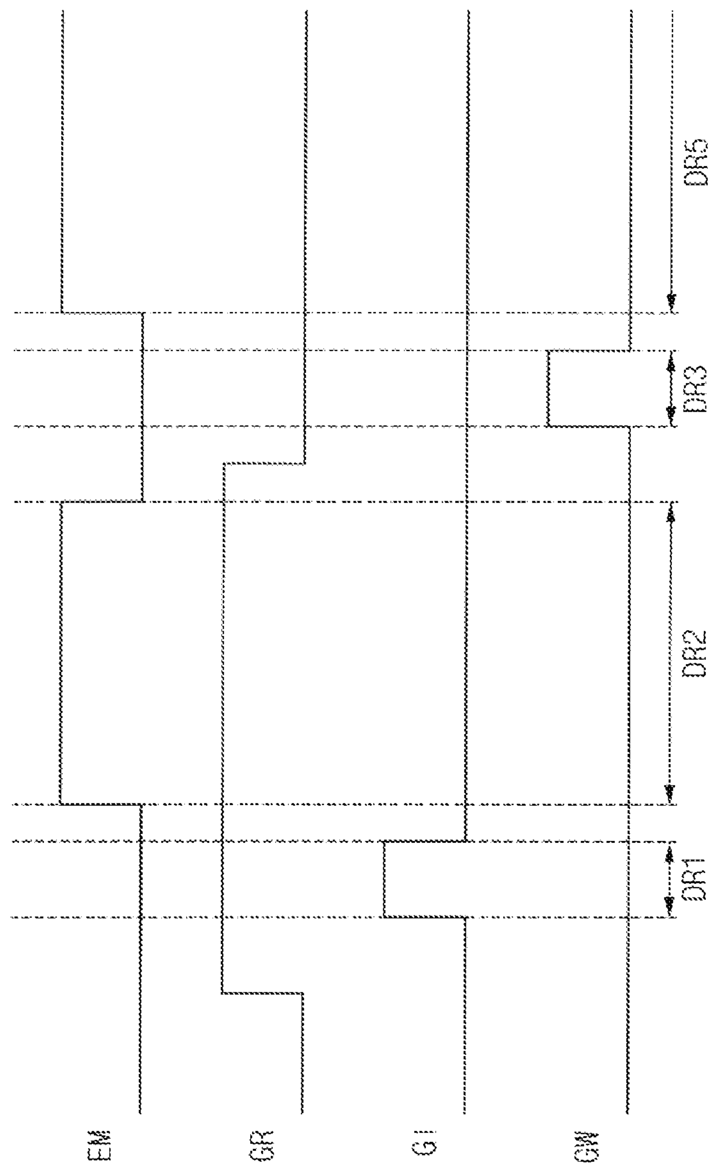
FIG. 9 is a timing diagram illustrating a gate signal and an emission signal applied to a normal pixel and a repair pixel of a display panel of a display apparatus according to an embodiment of the present inventive concept.

FIG. 9 is a timing diagram illustrating a gate signal and an emission signal applied to a normal pixel and a repair pixel of a display panel of a display apparatus according to an embodiment of the present inventive concept.

The display apparatus according to the present embodiment is substantially the same as the display apparatus of the previous embodiment explained referring to FIGS. 1 to 8 except for the gate signal and the emission signal applied to the pixel. Thus, the same reference numerals will be used to refer to the same or like parts as those described in the previous embodiment of FIGS. 1 to 8 and any repetitive explanation concerning the above elements will be omitted.

Referring to FIGS. 1 to 7 and 9, the post-initialization duration DR4 of FIG. 8 may be omitted from the timing diagram of FIG. 9. The post-initialization duration DR4 may be effective in a low frequency driving and a variable frequency driving, but may be omitted in driving of a display panel 100 which does not support the low frequency driving and the variable frequency driving. When the post-initialization duration DR4 is omitted, the power consumption of the display apparatus may be relatively reduced.

In a first duration DR1, the emission signal EM may have an inactive level, the reference gate signal GR may have an active level, the initialization gate signal GI may have an active level, and the write gate signal GW may have an inactive level.

The first duration DR1 may be referred to as an initialization duration. In the first duration DR1, the transistors T2, T5, and T6 may be turned off, the transistors T3 and T4 may be turned on, the reference voltage VREF may be applied to the control electrode N1 of the transistor T1 and the initialization voltage VINT may be applied to a source electrode N3 of the transistor T1.

In a second duration DR2 subsequent to the first duration DR1, the emission signal EM may have an active level, the reference gate signal GR may have the active level, the initialization gate signal GI may have an inactive level, and the write gate signal GW may have the inactive level.

The second duration DR2 may be referred to as a threshold voltage compensation duration. In the second duration DR2, the transistors T3, T5 and T6 may be turned on, the transistor T4 may be turned on, the reference voltage VREF may be applied to the control electrode N1 of the transistor T1, and a voltage VREF-VTH may be applied to the source electrode N3 of the transistor T1. Herein, the threshold voltage VTH of the transistor T1 may be stored at both ends of the storage capacitor CST according to a source follower operation of the transistor T1.

In a third duration DR3 subsequent to the second duration DR2, the emission signal EM may have the inactive level, the reference gate signal GR may have an inactive level, the initialization gate signal GI may have the inactive level, and the write gate signal GW may have an active level.

The third duration DR3 may be referred to as a data writing duration. In the third duration DR3, the transistors T3, T4, T5, and T6 may be turned off, the transistor T2 may be turned on, and the data voltage VDATA may be applied to the control electrode N1 of the transistor T1. Herein, the voltage of the source electrode N3 of the transistor T1 may be coupled with the voltage of the control electrode N1 of the transistor T1. When the reference voltage is VREF, the threshold voltage of the first transistor T1 is VTH, the data voltage is VDATA, a capacitance of the storage capacitor is CST, a capacitance of the hold capacitor is CHOLD, a capacitance of the initialization capacitor is CINT and the voltage of the third node N3 in the third duration DR3 is VS, $$VS = (VREF - VTH) + \frac{CST}{CST + CHOLD + CINT}(VDATA - VREF)$$

may be satisfied.

In a fifth duration DR5 subsequent to the third duration DR3, the emission signal EM may have the active level, the reference gate signal GR may have the inactive level, the initialization gate signal GI may have the inactive level, and the write gate signal GW may have the inactive level.

The fifth duration DR5 may be referred to as a light emission duration. In the fifth duration DR5, the transistors T2, T3 and T4 may be turned off, and the transistors T5 and T6 may be turned on. When the reference voltage is VREF, the data voltage is VDATA, the capacitance of the storage capacitor is CST, the capacitance of the hold capacitor is CHOLD, the capacitance of the initialization capacitor is CINT, a mobility of the first transistor T1 is a capacitance per a unit area of the first transistor T1 is $C_{ox}$, a width to length ratio of the first transistor T1 is W/L, and a source-drain current of the first transistor T1 in the fifth duration DR5 is IDS, $$IDS = \frac{1}{2}uCox\frac{W}{L}\left(\frac{CHOLD + CINT}{CST + CHOLD + CINT}(VDATA - VREF)\right)^2$$

may be satisfied.

In the above equation, the source-drain current IDS does not include a factor of the threshold voltage VTH so that the current for which the threshold voltage VTH is compensated may flow through the light emitting element EE in the light emission duration.

The normal pixel and the repair pixel may commonly operate in the first to fifth durations DR1 to DR5.

According to the present embodiment, the display panel 100 includes the repair pixel for one pixel row or the plurality of repair pixels for one pixel row so that repair may be performed using the repair pixel when a bad pixel occurs in the corresponding pixel row. The bad pixel is repaired using the repair pixel so that the yield of the display panel 100 may be enhanced.

Figure 10:
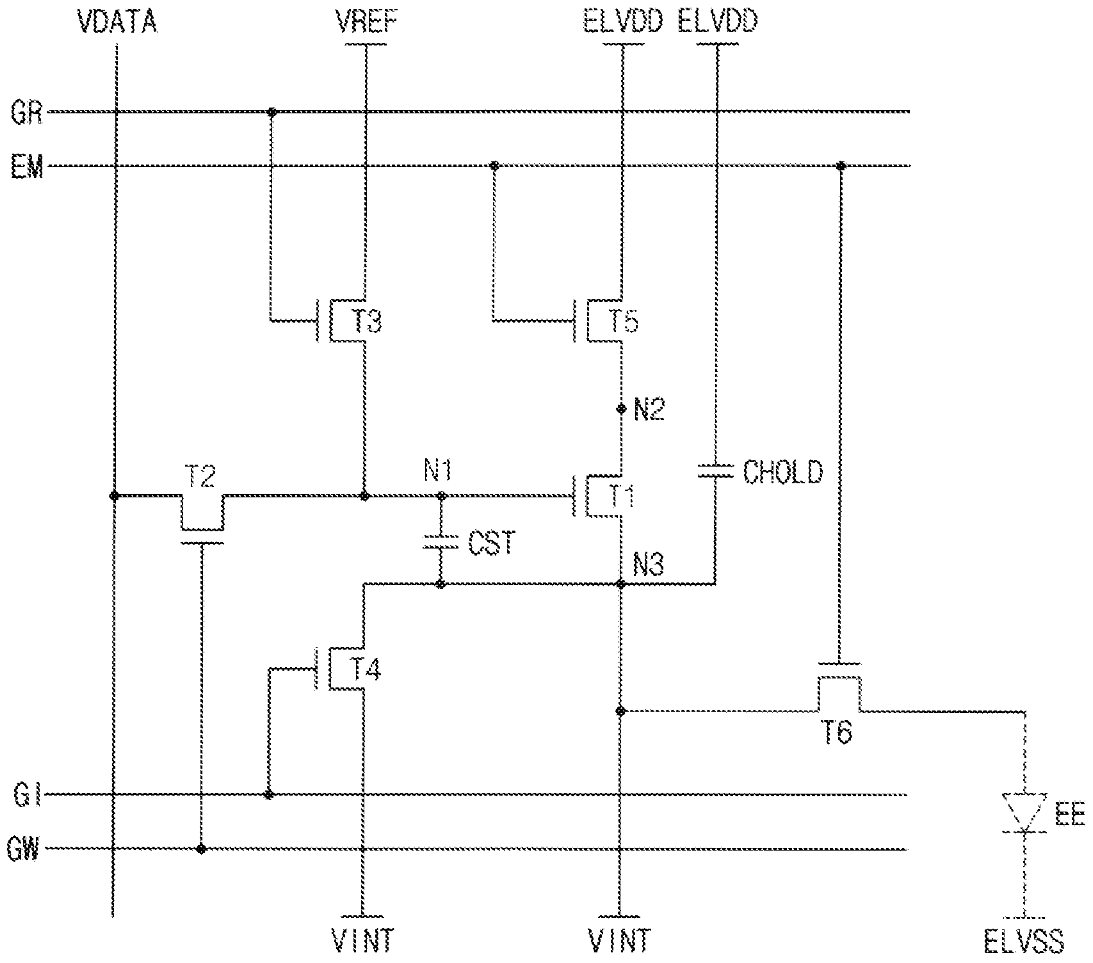
FIG. 10 is an equivalent circuit diagram illustrating a repair pixel of a display panel of a display apparatus according to an embodiment of the present inventive concept.

FIG. 10 is an equivalent circuit diagram illustrating a repair pixel of a display panel of a display apparatus according to an embodiment of the present inventive concept.

The display apparatus according to the present embodiment is substantially the same as the display apparatus of the previous embodiment explained referring to FIGS. 1 to 8 except for the structure of the repair pixel. Thus, the same reference numerals will be used to refer to the same or like parts as those described in the previous embodiment of FIGS. 1 to 8 and any repetitive explanation concerning the above elements will be omitted.

Referring to FIGS. 1 to 6, 8 and 10, the initialization capacitor CINT as shown in FIG. 7 may be omitted from the structure of the repair pixel of the present embodiment as shown in FIG. 10. The initialization capacitor CINT may be set to a value corresponding to a device capacitance of the light emitting element of the normal pixel. However, depending on the structure and characteristics of the display panel 100, the initialization capacitor CINT may be omitted in consideration of a delay of the repair line.

The repair pixel includes a first transistor T1 including a control electrode connected to a first node N1, an input electrode connected to a second node N2, and an output electrode connected to a third node N3; a second transistor T2 including a control electrode receiving a write gate signal GW, an input electrode receiving the data voltage VDATA, and an output electrode connected to the first node N1; a third transistor T3 including a control electrode receiving the reference gate signal GR, an input electrode receiving the reference voltage VREF, and an output electrode connected to the first node N1; a fourth transistor T4 including a control electrode receiving the initialization gate signal GI, an input electrode receiving the initialization voltage VINT, and an output electrode connected to the third node N3; a fifth transistor T5 including a control electrode receiving the emission signal EM, an input electrode receiving the first power voltage ELVDD, and an output electrode connected to the second node N2; and a sixth transistor T6 including a control electrode receiving the emission signal EM, an input electrode connected to the third node N3, and an output electrode connected to the repair line.

The repair pixel may further include a storage capacitor CST including a first electrode connected to the first node N1 and a second electrode connected to the third node N3.

The repair pixel may further include a hold capacitor CHOLD including a first electrode receiving the first power voltage ELVDD and a second electrode connected to the third node N3.

Herein, the first transistor T1 to the sixth transistor T6 may be N-type transistors. Herein, the first transistor T1 to the sixth transistor T6 may be oxide transistors.

In a first duration DR1 the emission signal EM may have an inactive level, the reference gate signal GR may have an active level, the initialization gate signal GI may have an active level, and the write gate signal GW may have an inactive level.

The first duration DR1 may be referred to as an initialization duration. In the first duration DR1, the transistors T2, T5, and T6 may be turned off, the transistors T3 and T4 may be turned on, the reference voltage VREF may be applied to the control electrode N1 of the transistor T1, and the initialization voltage VINT may be applied to a source electrode N3 of the transistor T1.

In a second duration DR2 subsequent to the first duration DR1, the emission signal EM may have an active level, the reference gate signal GR may have the active level, the initialization gate signal GI may have an inactive level, and the write gate signal GW may have the inactive level.

The second duration DR2 may be referred to as a threshold voltage compensation duration. In the second duration DR2, the transistors T3, T5, and T6 may be turned on, the transistor T4 may be turned on, the reference voltage VREF may be applied to the control electrode N1 of the transistor T1, and a voltage VREF-VTH may be applied to the source electrode N3 of the transistor T1. Herein, the threshold voltage VTH of the transistor T1 may be stored at both ends of the storage capacitor CST according to a source follower operation of the transistor T1.

In a third duration DR3 subsequent to the second duration DR2, the emission signal EM may have the inactive level, the reference gate signal GR may have an inactive level, the initialization gate signal GI may have the inactive level, and the write gate signal GW may have an active level.

The third duration DR3 may be referred to as a data writing duration. In the third duration DR3, the transistors T3, T4, T5, and T6 may be turned off, the transistor T2 may be turned on, the data voltage VDATA may be applied to the control electrode N1 of the transistor T1. Herein, the voltage of the source electrode N3 of the transistor T1 may be coupled with the voltage of the control electrode N1 of the transistor T1. When the reference voltage is VREF, the threshold voltage of the first transistor T1 is VTH, the data voltage is VDATA, a capacitance of the storage capacitor is CST, a capacitance of the hold capacitor is CHOLD, and the voltage of the third node N3 in the third duration DR3 is VS, $$VS = (VREF - VTH) + \frac{CST}{CST + CHOLD}(VDATA - VREF)$$

may be satisfied.

In a fourth duration DR4 subsequent to the third duration DR3, the emission signal EM may have the inactive level, the reference gate signal GR may have the inactive level, the initialization gate signal GI may have the active level, and the write gate signal GW may have the inactive level.

The fourth duration DR4 may be referred to as a post-initialization duration. In the fourth duration DR4, the transistors T2, T3, T5, and T6 may be turned off, the transistor T4 may be turned on, and the source electrode N3 of the transistor T1 may be initialized to the initialization voltage VINT.

In a fifth duration DR5 subsequent to the fourth duration DR4, the emission signal EM may have the active level, the reference gate signal GR may have the inactive level, the initialization gate signal GI may have the inactive level, and the write gate signal GW may have the inactive level.

The fifth duration DR5 may be referred to as a light emission duration. In the fifth duration DR5, the transistors T2, T3, and T4 may be turned off, the transistors T5 and T6 may be turned on. When the reference voltage is VREF, the data voltage is VDATA, the capacitance of the storage capacitor is CST, the capacitance of the hold capacitor is CHOLD, a mobility of the first transistor T1 is a capacitance per a unit area of the first transistor T1 is $C_{ox}$, a width to length ratio of the first transistor T1 is W/L, and a source-drain current of the first transistor T1 in the fifth duration DR5 is IDS, $$IDS = \frac{1}{2} uCox \frac{W}{L} \left( \frac{CHOLD}{CST + CHOLD} (VDATA - VREF) \right)^2$$

may be satisfied.

In the above equation, the source-drain current IDS does not include a factor of the threshold voltage VTH so that the current for which the threshold voltage VTH is compensated may flow through the light emitting element EE in the light emission duration.

The normal pixel and the repair pixel may commonly operate in the first to fifth durations DR1 to DR5.

According to the present embodiment, the display panel 100 includes the repair pixel for one pixel row or the plurality of repair pixels for one pixel row so that repair may be performed using the repair pixel when a bad pixel occurs in the corresponding pixel row. The bad pixel is repaired using the repair pixel so that the yield of the display panel 100 may be enhanced.

According to the repair pixel and the display apparatus of the present inventive concept as explained above, the bad pixel may be repaired so that the yield of the display panel may be enhanced.

Although certain embodiments and implementations have been described herein, other embodiments and modifications will be apparent from this description. Accordingly, the inventive concept is not limited to such embodiments, but rather to the broader scope of the appended claims and various obvious modifications and equivalent arrangements as would be apparent to a person of ordinary skill in the art.

What is claimed is:

1. A repair pixel comprising:

a first transistor including a control electrode connected to a first node, an input electrode connected to a second node, and an output electrode connected to a third node;

a second transistor including a control electrode configured to receive a write gate signal, an input electrode configured to receive a data voltage, and an output electrode connected to the first node;

a third transistor including a control electrode configured to receive a reference gate signal, an input electrode configured to receive a reference voltage, and an output electrode connected to the first node;

a fourth transistor including a control electrode configured to receive an initialization gate signal, an input electrode configured to receive an initialization voltage, and an output electrode connected to the third node;

a fifth transistor including a control electrode configured to receive an emission signal, an input electrode configured to receive a first power voltage, and an output electrode connected to the second node;

a sixth transistor including a control electrode configured to receive the emission signal, an input electrode connected to the third node and an output electrode connected to a repair line; and an initialization capacitor including a first electrode connected directly to the third node and a second electrode configured to receive the initialization voltage.

2. The repair pixel of claim 1, further comprising a storage capacitor including a first electrode connected to the first node and a second electrode connected to the third node.

3. The repair pixel of claim 2, further comprising a hold capacitor including a first electrode configured to receive the first power voltage and a second electrode connected to the third node.

4. The repair pixel of claim 3, wherein, in a first duration, the emission signal has an inactive level, the reference gate signal has an active level, the initialization gate signal has the active level, and the write gate signal has the inactive level.

5. The repair pixel of claim 4, wherein, in a second duration subsequent to the first duration, the emission signal has the active level, the reference gate signal has the active level, the initialization gate signal has the inactive level and the write gate signal has the inactive level.

6. The repair pixel of claim 5, wherein, in a third duration subsequent to the second duration, the emission signal has the inactive level, the reference gate signal has the inactive level, the initialization gate signal has the inactive level and the write gate signal has the active level.

7. The repair pixel of claim 6, wherein when the reference voltage is VREF, a threshold voltage of the first transistor is VTH, the data voltage is VDATA, a capacitance of the storage capacitor is CST, a capacitance of the hold capacitor is CHOLD, a capacitance of the initialization capacitor is CI NT, and a voltage of the third node in the third duration is VS, $$VS = (VREF - VTH) + \frac{CST}{CST + CHOLD + CINT} (VDATA - VREF)$$

is satisfied.

8. The repair pixel of claim 6, wherein, in a fourth duration subsequent to the third duration, the emission signal has the inactive level, the reference gate signal has the inactive level, the initialization gate signal has the active level, and the write gate signal has the inactive level.

9. The repair pixel of claim 6, wherein, in a fifth duration subsequent to the third duration, the emission signal has the active level, the reference gate signal has the inactive level, the initialization gate signal has the inactive level, and the write gate signal has the inactive level.

10. The repair pixel of claim 9, wherein, when the reference voltage is VREF, the data voltage is VDATA, a capacitance of the storage capacitor is CST, a capacitance of the hold capacitor is CHOLD, a capacitance of the initialization capacitor is CI NT, a mobility of the first transistor is μ, a capacitance per a unit area of the first transistor is $C_{ox}$, a width to length ratio of the first transistor is W/L, and a source-drain current of the first transistor in the fifth duration is IDS, $$IDS = \frac{1}{2} uCox \frac{W}{L} \left( \frac{CHOLD + CINT}{CST + CHOLD + CINT} (VDATA - VREF) \right)^2$$

is satisfied.

11. A repair pixel comprising:

a first transistor including a control electrode connected to a first node, an input electrode connected to a second node, and an output electrode connected to a third node;

a second transistor including a control electrode configured to receive a write gate signal, an input electrode configured to receive a data voltage, and an output electrode connected to the first node;

a third transistor including a control electrode configured to receive a reference gate signal, an input electrode configured to receive a reference voltage, and an output electrode connected to the first node;

a fourth transistor including a control electrode configured to receive an initialization gate signal, an input electrode configured to receive an initialization voltage, and an output electrode connected to the third node;

a fifth transistor including a control electrode configured to receive an emission signal, an input electrode configured to receive a first power voltage, and an output electrode connected to the second node;

a sixth transistor including a control electrode configured to receive the emission signal, an input electrode connected to the third node and an output electrode connected to a repair line;

a storage capacitor including a first electrode connected to the first node and a second electrode connected to the third node; and a hold capacitor including a first electrode configured to receive the first power voltage and a second electrode connected to the third node, wherein when the reference voltage is VREF, a threshold voltage of the first transistor is VTH, the data voltage is VDATA, a capacitance of the storage capacitor is CST, a capacitance of the hold capacitor is CHOLD, and a voltage of the third node in the third duration is VS, $$VS = (VREF - VTH) + \frac{CST}{CST + CHOLD}(VDATA - VREF)$$

is satisfied.

12. A repair pixel comprising:

a first transistor including a control electrode connected to a first node, an input electrode connected to a second node, and an output electrode connected to a third node;

a second transistor including a control electrode configured to receive a write gate signal, an input electrode configured to receive a data voltage, and an output electrode connected to the first node;

a third transistor including a control electrode configured to receive a reference gate signal, an input electrode configured to receive a reference voltage, and an output electrode connected to the first node;

a fourth transistor including a control electrode configured to receive an initialization gate signal, an input electrode configured to receive an initialization voltage, and an output electrode connected to the third node;

a fifth transistor including a control electrode configured to receive an emission signal, an input electrode configured to receive a first power voltage, and an output electrode connected to the second node;

a sixth transistor including a control electrode configured to receive the emission signal, an input electrode connected to the third node and an output electrode connected to a repair line;

a storage capacitor including a first electrode connected to the first node and a second electrode connected to the third node; and a hold capacitor including a first electrode configured to receive the first power voltage and a second electrode connected to the third node, wherein when the reference voltage is VREF, the data voltage is VDATA, a capacitance of the storage capacitor is CST, a capacitance of the hold capacitor is CHOLD, a mobility of the first transistor is μ, a capacitance per a unit area of the first transistor is $C_{ox}$, a width to length ratio of the first transistor is W/L, and a source-drain current of the first transistor in the fifth duration is IDS, $$IDS = \frac{1}{2}uCox\frac{W}{L}\left(\frac{CHOLD}{CST + CHOLD}(VDATA - VREF)\right)^2$$

is satisfied.

13. A display apparatus comprising:

a display panel including a normal pixel and a repair pixel;

a gate driver configured to apply a gate signal to the normal pixel and the repair pixel;

a data driver configured to apply a data voltage to the normal pixel and the repair pixel; and an emission driver configured to apply an emission signal to the normal pixel and the repair pixel, wherein the repair pixel comprises:

a first transistor including a control electrode connected to a first node, an input electrode connected to a second node, and an output electrode connected to a third node;

a second transistor including a control electrode configured to receive a write gate signal, an input electrode configured to receive the data voltage, and an output electrode connected to the first node;

a third transistor including a control electrode configured to receive a reference gate signal, an input electrode configured to receive a reference voltage, and an output electrode connected to the first node;

a fourth transistor including a control electrode configured to receive an initialization gate signal, an input electrode configured to receive an initialization voltage, and an output electrode connected to the third node;

a fifth transistor including a control electrode configured to receive the emission signal, an input electrode configured to receive a first power voltage, and an output electrode connected to the second node;

a sixth transistor including a control electrode configured to receive the emission signal, an input electrode connected to the third node, and an output electrode connected to a repair line; and an initialization capacitor including a first electrode connected directly to the third node and a second electrode configured to receive the initialization voltage.

14. The display apparatus of claim 13, wherein the repair pixel further comprises a storage capacitor including a first electrode connected to the first node and a second electrode connected to the third node.

15. The display apparatus of claim 14, wherein the repair pixel further comprises a hold capacitor including a first electrode configured to receive the first power voltage and a second electrode connected to the third node.

16. The display apparatus of claim 13, wherein the normal pixel comprises:

a first normal transistor including a control electrode connected to a first normal node, an input electrode connected to a second normal node, and an output electrode connected to a third normal node;

a second normal transistor including a control electrode configured to receive the write gate signal, an input electrode configured to receive the data voltage, and an output electrode connected to the first normal node;

a third normal transistor including a control electrode configured to receive the reference gate signal, an input electrode configured to receive the reference voltage, and an output electrode connected to the first normal node;

a fourth normal transistor including a control electrode configured to receive the initialization gate signal, an input electrode configured to receive the initialization voltage, and an output electrode connected to the third normal node;

a fifth normal transistor including a control electrode configured to receive the emission signal, an input electrode configured to receive the first power voltage, and an output electrode connected to the second normal node; and a light emitting element including a first electrode connected to the third normal node and a second electrode configured to receive a second power voltage.

17. The display apparatus of claim 16, wherein the normal pixel further comprises:

a normal storage capacitor including a first electrode connected to the first normal node and a second electrode connected to the third normal node; and a normal hold capacitor including a first electrode configured to receive the first power voltage and a second electrode connected to the third normal node.

18. The display apparatus of claim 13, wherein the display panel comprises:

first normal pixels disposed in a first pixel row; and a first repair pixel disposed in the first pixel row and connected to the first normal pixels to repair a defect of the first normal pixels.

19. The display apparatus of claim 13, wherein the display panel comprises:

first left normal pixels disposed in a left portion of a first pixel row;

a first repair pixel disposed in the first pixel row and connected to the first left normal pixels to repair a defect of the first left normal pixels;

first right normal pixels disposed in a right portion of the first pixel row; and a second repair pixel disposed in the first pixel row and connected to the first right normal pixels to repair a defect of the first right normal pixels.

* * * * *